US010075072B2

(12) United States Patent
Kuwano (10) Patent No.: US 10,075,072 B2
(45) Date of Patent: Sep. 11, 2018

(54) SEMICONDUCTOR APPARATUS, POWER SUPPLY APPARATUS, ELECTRONIC DEVICE, AND CONTROL METHOD FOR POWER SUPPLY APPARATUS

(71) Applicant: SEIKO EPSON CORPORATION, Tokyo (JP)

(72) Inventor: Toshikazu Kuwano, Fujimi-machi (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 15/855,417

(22) Filed: Dec. 27, 2017

(65) Prior Publication Data

US 2018/0212517 A1 Jul. 26, 2018

(30) Foreign Application Priority Data

Jan. 20, 2017 (JP) ................................. 2017-008210

(51) Int. Cl.
| G05F 1/40 | (2006.01) |
| H02M 3/156 | (2006.01) |
| H02M 1/36 | (2007.01) |
| H02M 1/08 | (2006.01) |

(52) U.S. Cl.
CPC ............ *H02M 3/156* (2013.01); *H02M 1/08* (2013.01); *H02M 1/36* (2013.01)

(58) Field of Classification Search
CPC . G05F 1/56; H02M 3/158; H02M 2001/0009; H02M 1/36; Y02B 70/1466
See application file for complete search history.

(56) References Cited

U.S. PATENT DOCUMENTS

| 5,237,244 A * | 8/1993 | Bertenshaw ............ G05F 1/455 315/224 |
| 5,751,140 A * | 5/1998 | Canter ...................... G05F 1/56 323/282 |
| 7,030,596 B1 * | 4/2006 | Salerno ................. H02M 3/158 323/282 |
| 7,868,595 B1 * | 1/2011 | Smith ..................... H02M 1/36 323/222 |
| 9,054,596 B2 * | 6/2015 | Ishii ........................ H02M 1/36 |
| 2003/0062880 A1 | 4/2003 | Sudou |

FOREIGN PATENT DOCUMENTS

| JP | 2003-111391 A | 4/2003 |
| JP | 2005-168230 A | 6/2005 |
| JP | 2007-159288 A | 6/2007 |
| JP | 2007-159371 A | 6/2007 |
| JP | 2007-306681 A | 11/2007 |
| JP | 2010-207005 A | 9/2010 |

\* cited by examiner

*Primary Examiner* — Rajnikant Patel
(74) *Attorney, Agent, or Firm* — Oliff PLC (57) ABSTRACT

A semiconductor apparatus includes: a switch circuit connected between a first power supply terminal and an output terminal; a switching element connected between the output terminal and a second power supply terminal; and a control circuit that, when a predetermined period has elapsed since the entry of the switch circuit into an ON state in response to an enable signal, causes the switching element to start a switching operation to increase a power supply voltage supplied between the first power supply terminal and the second power supply terminal.

13 Claims, 4 Drawing Sheets

FIG. 6

SEMICONDUCTOR APPARATUS, POWER SUPPLY APPARATUS, ELECTRONIC DEVICE, AND CONTROL METHOD FOR POWER SUPPLY APPARATUS This application claims the benefit of Japanese Patent Application No. 2017-008210, filed on Jan. 20, 2017. The content of the aforementioned application is incorporated herein by reference in its entirety.

BACKGROUND

1. Technical Field

The present invention relates to a semiconductor apparatus that is used to increase a power supply voltage. The invention also relates to a power supply apparatus that uses such a semiconductor apparatus. The invention further relates to an electronic device that includes such a power supply apparatus, a control method for the power supply apparatus, and the like.

2. Related Art

In a switching regulator that increases a power supply voltage supplied from a battery and the like, for example, the voltage of a voltage increasing node is gradually raised after the power is turned ON in order to suppress fluctuations in the power supply voltage by reducing inrush current that flows through a smoothing capacitor after the power is turned ON. This operation is called a soft start.

As related art, JP-A-2003-111391 (paragraphs 0007 to 0016, FIGS. 1 and 2) discloses a voltage increasing switching regulator that is intended to suppress inrush current when the power is turned ON. The switching regulator shown in FIG. 1 of JP-A-2003-111391 includes a switching element 22 and a MOS transistor 40 that is connected between a power supply 20 and a coil 21. In this switching regulator, a resistance value of the MOS transistor 40 is changed from a high state to a low state when the power is turned ON. As a result, inrush current is suppressed when the power is turned ON.

On the other hand, JP-A-2010-207005 (paragraphs 0007 to 0024, FIGS. 1 and 2) discloses a voltage increasing switching regulator that is intended to prevent the occurrence of inrush current using simple circuit configurations. The switching regulator shown in FIG. 1 of JP-A-2010-207005 includes: a switching transistor M1 that performs switching in accordance with a control signal; PMOS transistors M2 and M3 that supply an input voltage to an inductor L1; and a control circuit unit that turns ON the PMOS transistor M2 to supply the input voltage to the inductor L1 after a predetermined period has elapsed since the PMOS transistor M3 was turned ON to start the supply of the input voltage.

JP-A-2003-111391 (paragraphs 0007 to 0016, FIGS. 1 and 2) and JP-A-2010-207005 (paragraphs 0007 to 0024, FIGS. 1 and 2) are examples of related art.

The switching regulator shown in FIG. 1 of JP-A-2003-111391 realizes a soft-start function by changing ON resistance of the MOS transistor 40.

However as the ON resistance of the MOS transistor 40 changes significantly in response to a slight change in a gate voltage, controlling of the ON resistance is difficult.

On the other hand, in the switching regulator shown in FIG. 1 of JP-A-2010-207005, the PMOS transistor M3 with large ON resistance and the PMOS transistor M2 with small ON resistance are connected in parallel to each other. A soft-start function is realized by turning ON the PMOS transistor M2 after the PMOS transistor M3 is turned ON.

In a case where a part of circuits of the switching regulator shown in FIG. 1 of JP-A-2010-207005 is built in a semiconductor apparatus (IC), it is preferable to build the PMOS transistor M3 with the large ON resistance, as well as the switching transistor M1 that performs switching in accordance with a control signal, in the IC. This is because the PMOS transistor M3 and the switching transistor M1 need not be very large in size.

However, in this case, it is necessary to provide the IC with a terminal connected to a drain of the PMOS transistor M3 and a terminal connected to a drain of the switching transistor M1, and mount the inductor L1 as an external component between these terminals. This gives rise to the problem that the number of terminals of the IC becomes large compared to a case where only the switching transistor M1 is built in the IC.

Furthermore, referring to FIG. 2 of JP-A-2003-111391, the ON resistance of the MOS transistor 40 is controlled by the time constants of a capacitor 413 and a resistor 411 of a MOS transistor control circuit 41. Similarly, referring to FIG. 2 of JP-A-2010-207005, a soft-start operation is controlled by the time constants of a capacitor C11 and a resistor R11 of a soft-start circuit 2.

However, building a large-capacity capacitor, such as the capacitor 413 or the capacitor C11, in an IC gives rise to the problem that a chip area increases as the capacitor occupies a large area within a semiconductor chip, or the problem that variations in a capacitance value of the capacitor cause variations in an operation timing.

SUMMARY

A first advantage of some aspects of the invention is to realize a soft-start function of reducing inrush current by gradually raising a voltage of a voltage increasing node after the power is turned on, while suppressing an increase in the number of terminals of a semiconductor apparatus, in a case where a switch circuit and a switching element are built in the semiconductor apparatus. The switch circuit supplies voltage to the voltage increasing node during a soft-start operation, and the switching element performs switching during a voltage increasing operation.

Furthermore, a second advantage of some aspects of the invention is to set, in such a semiconductor apparatus, a period that is necessary for the soft-start operation without using a time constant circuit including a capacitor. Moreover, a third advantage of some aspects of the invention is to provide a power supply apparatus using such a semiconductor apparatus, an electronic device including such a power supply apparatus, a control method for the power supply apparatus, and the like.

A semiconductor apparatus according to a first aspect of the invention includes: a switch circuit connected between a first power supply terminal and an output terminal; a switching element connected between the output terminal and a second power supply terminal; and a control circuit that, when a predetermined period has elapsed since the entry of the switch circuit into an ON state in response to an enable signal, causes the switching element to start a switching operation to increase a power supply voltage supplied between the first power supply terminal and the second power supply terminal.

According to the first aspect of the invention, the switching element starts the switching operation and increases the power supply voltage when the predetermined period has elapsed since the potential of the output terminal started to increase upon the entry of the switch circuit into the ON state. It is thus possible to realize a soft-start function of reducing inrush current by gradually raising a voltage of a voltage creasing node after the power is turned ON. Furthermore, as both of the switch circuit and the switching element are connected to the output terminal, an increase in the number of terminals of the semiconductor apparatus can be suppressed even if the switch circuit and the switching element are built in the semiconductor apparatus.

Here, it is preferable that the control circuit places the switch circuit in an OFF state and places a second switch circuit in an ON state when a first period has elapsed since the entry of the switch circuit into the ON state, the second switch circuit being connected between the other end of an inductor having one end connected to the output terminal and the first power supply terminal. By thus applying voltage between the both ends of the inductor after the potential of the output terminal has increased, drastic fluctuations in a potential difference between the both ends of the inductor can be suppressed.

In this case, it is preferable that the control circuit causes the switching element to start the switching operation when a second period has elapsed since the entry of the second switch circuit into the ON state. In this way, the switching element can start the switching operation in response to a further increase in the potential of the output terminal.

Furthermore, it is preferable that the control circuit supplies a first driving signal to the switching element after the second period has elapsed since the entry of the second switch circuit into the ON state, the first driving signal having an ON duty cycle that monotonically increases with time. Consequently, the switching element performs the switching operation in accordance with the first driving signal, and the voltage of the voltage increasing node can be gradually increased.

Furthermore, it is preferable that the control circuit supplies a second driving signal to the switching element after the voltage of the voltage increasing node has exceeded a predetermined voltage, the second driving signal having undergone pulse-width modulation based on the voltage of the voltage increasing node. Consequently, the switching element performs the switching operation in accordance with the second driving signal, and the voltage of the voltage increasing node can be converged on a target voltage.

In the foregoing configurations, it is preferable that the switch circuit includes a plurality of transistors that are connected in series to one another between the first power supply terminal and the output terminal. For example, in a case where a plurality of P-channel MOS transistors are connected in series to one another between the first power supply terminal and the output terminal, parasitic PNP bipolar transistors can prevent the flow of current from the output terminal to the first power supply terminal even if the potential of the output terminal exceeds the potential of the first power supply terminal.

Furthermore, it is preferable that the semiconductor apparatus further includes a clock signal generation circuit that generates a system clock signal, and the control circuit generates the first driving signal based on the system clock signal. Accordingly, ON and OFF periods of the switching element in the soft-start operation can be finely set without using a time constant circuit including a capacitor. In addition, as a part of a test for the soft-start operation can be performed digitally, a test for the semiconductor apparatus can be made efficient.

Furthermore, when the semiconductor apparatus includes the clock signal generation circuit, it is preferable that the control circuit sets the first period or the second period based on the system clock signal. In this way, the first period or the second period in the soft-start operation can be accurately set without using a time constant circuit including a capacitor.

Alternatively, it is preferable that the control circuit sets the first period or the second period based on the voltage of the voltage increasing node. In this way, the first period or the second period in the soft-start operation can be adaptively set without using a time constant circuit including a capacitor.

A power supply apparatus according to a second aspect of the invention includes: the semiconductor apparatus having any of the foregoing configurations; an inductor having one end connected to the output terminal; a diode connected between the output terminal and a voltage increasing node; and a capacitor connected between the voltage increasing node and the second power supply terminal.

The second aspect of the invention can provide a power supply apparatus that realizes a soft-start function of reducing inrush current by gradually raising an output voltage after the power is turned ON with the use of a semiconductor apparatus in which an increase in the number of terminals is suppressed and which includes a switch circuit and a switching element built therein. The switch circuit starts to increase the potential of the output terminal when the power is turned ON, and the switching element starts a voltage increasing operation when a predetermined period has elapsed since the potential of the output terminal started to increase.

It is preferable that this power supply apparatus further includes a second switch circuit connected between the first power supply terminal and the other end of the inductor. In this case, the semiconductor apparatus can be downsized by using the second switch circuit, which is large in size so as to reduce ON resistance, as an external component of the semiconductor apparatus.

An electronic device according to a third aspect of the invention includes: the power supply apparatus having any of the foregoing configurations; and a load to which an output voltage of the power supply apparatus is supplied. The third aspect of the invention can provide a highly reliable electronic device that reduces fluctuations in a power supply voltage when the power is turned ON with the use of a power supply apparatus that realizes a soft-start function of reducing inrush current by gradually raising the output voltage after the power is turned ON.

A control method for a power supply apparatus according to a fourth aspect of the invention is a control method for a power supply apparatus that increases a power supply voltage supplied between a first power supply wire and a second power supply wire. The control method includes: (a) placing a first switch circuit connected to the first power supply wire in an ON state, and starting charging of a capacitor connected between one end of an inductor and the second power supply wire via a diode; (b) placing a second switch circuit in an ON state when a first period has elapsed since the entry of the first switch circuit into the ON state, the second switch circuit being connected between the first power supply wire and the other end of the inductor; (c) generating a first driving signal based on a system clock signal and supplying the first driving signal to a switching element connected between the one end of the inductor and the second power supply wire after a second period has elapsed since entry of the second switch circuit into the ON state, the first driving signal having an ON duty cycle that monotonically increases with time; and (d) supplying a second driving signal to the switching element after a voltage between both ends of the capacitor has exceeded a predetermined voltage, the second driving signal having undergone pulse-width modulation based on the voltage between the both ends of the capacitor.

According to the fourth aspect of the invention, charging of the capacitor is started with the first switch circuit placed in the ON state, and the voltage between the both ends of the capacitor further increases with the second switch circuit placed in the ON state. Thereafter, the first driving signal, which has an ON duty cycle that monotonically increases with time, is generated based on the system clock signal and supplied to the switching element. Therefore, ON and OFF periods of the switching element in a soft-start operation can be finely set without using constant circuit including a capacitor.

BRIEF DESCRIPTION OF THE DRAWINGS

The invention will be described with reference to the accompanying drawings, wherein like numbers reference like elements.

DESCRIPTION OF EXEMPLARY EMBODIMENTS

The following describes an embodiment of the invention in detail with reference to the drawings. Note that the same constituent elements are given the same reference signs to omit redundant explanations.

Figure 1:
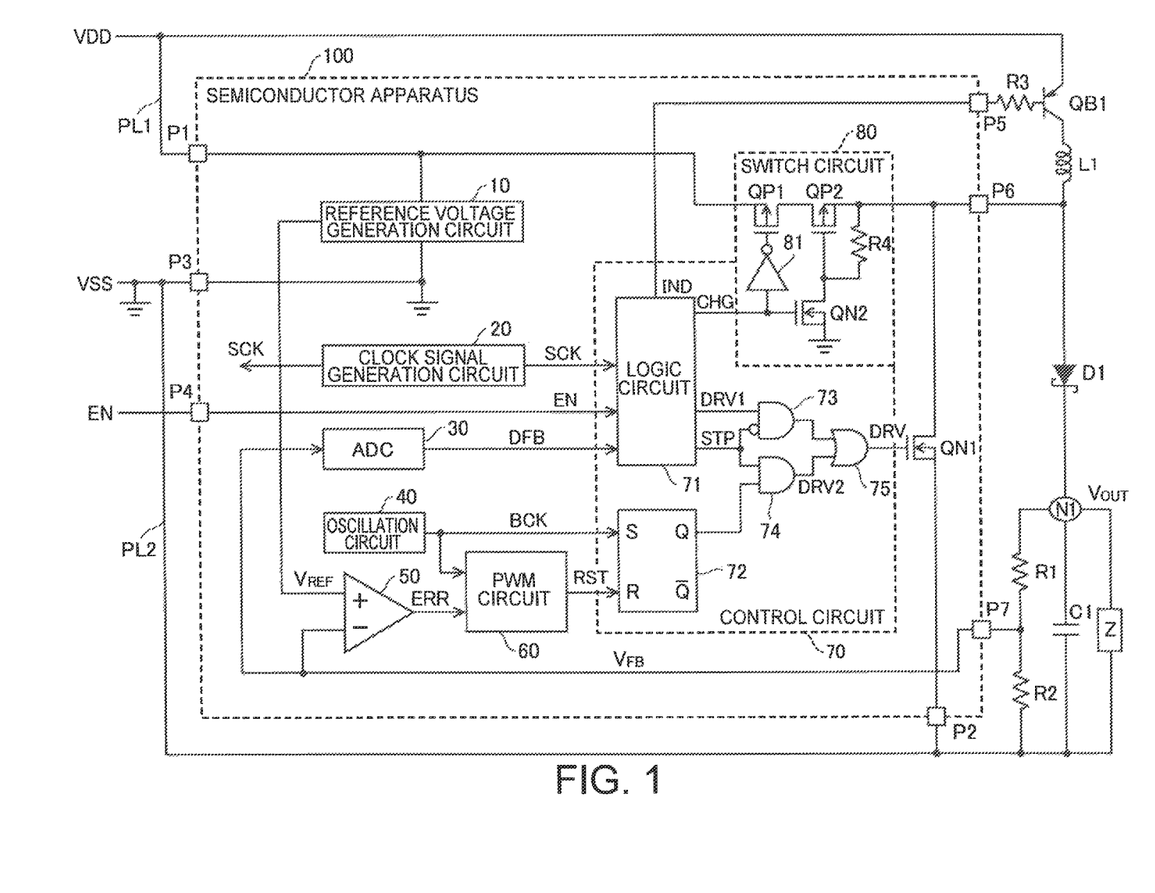
FIG. 1 is a circuit diagram showing an exemplary configuration of a power supply apparatus according to an embodiment of the invention.

FIG. 1 is a circuit diagram showing an exemplary configuration of a power supply apparatus according to an embodiment of the invention. In the following embodiment, a switching regulator (a DC-to-DC converter) that increases a power supply voltage will be described as an example of the power supply apparatus.

Switching Regulator

As shown in FIG. 1, this switching regulator includes the following elements according to an embodiment of the invention: a semiconductor apparatus (IC) 100, a PNP bipolar transistor QB1, an inductor L1, a diode D1, a capacitor C1, and resistors R1 to R3.

In the switching regulator, a power supply potential VDD of a high-potential side is supplied from a first power supply wire PL1, and a power supply potential VSS of a low-potential side is supplied from a second power supply wire PL2. FIG. 1 depicts a case in which the power supply potential VSS is a ground potential (0 V). In a steady state, the switching regulator generates an output voltage $V_{OUT}$ in a voltage increasing node N1 by increasing a power supply voltage (VDD-VSS), and supplies the output voltage $V_{OUT}$ to a load Z.

The semiconductor apparatus 100 may be, for example, a SoC (system on a chip), such as an MCU (microcontroller unit) or an LCD (liquid crystal display) controller. A part of circuits of the switching regulator is built in the semiconductor apparatus 100. Note that a SoC denotes a semiconductor apparatus in which a series of functions (systems) that are supposed to be necessary for an electronic device and the like is integrated on one semiconductor chip.

The semiconductor apparatus 100 includes a reference voltage generation circuit 10, a clock signal generation circuit 20, an ADC (analog-to-digital converter) 30, an oscillation circuit 40, an operational amplifier 50, a PWM (pulse-width modulation) circuit 60, a control circuit 70, a switch circuit 80, an N-channel MOS transistor QN1, and terminals P1 to P7. Each of the terminals P1 to P7 is a pad mounted on a semiconductor chip, or a pin mounted on a package.

The power supply potential VDD of the high-potential side is supplied to the first power supply terminal P1 from the first power supply wire PL1. The power supply potential VSS of the low-potential side is supplied to the second power supply terminal P2 and the third p apply terminal P3 from the second power supply wire PL2. The reference voltage generation circuit 10, for example, includes a bandgap reference circuit and the like, and generates a reference voltage $V_{REF}$ that is independent of the power supply voltage (VDD-VSS).

The clock signal generation circuit 20, for example, includes a crystal oscillation circuit and the like, and generates a system clock signal SCK that is supplied to a CPU (central processing unit) included in the semiconductor apparatus 100, etc. The frequency of the system clock signal SCK is, for example, approximately several tens of MHz to 100 MHz. The system clock signal SCK is also supplied to the control circuit 70, and the control circuit 70 operates in synchronization with the system clock signal SCK.

The ADC 30 converts a feedback voltage $V_{FB}$ supplied from the feedback terminal P7 into a digital feedback signal DFB, and supplies the digital feedback signal DFB to the control circuit 70. The oscillation circuit 40, for example, is composed of a CR oscillation circuit and the like, and generates a voltage increasing clock signal BCK by oscillating. The frequency of the voltage increasing clock signal BCK is, for example, approximately 100 kHz to a few MHz.

In a case where the semiconductor apparatus 100 includes the clock signal generation circuit 20 that generates the system clock signal SCK having a higher frequency than the voltage increasing clock signal BCK as described above, the control circuit 70 can make use of the system clock signal SCK so as to set a necessary period in a soft-start operation of the switching regulator.

The reference voltage generation circuit 10 supplies the reference voltage $V_{REF}$ to a non-inverting input terminal of the operational amplifier 50. The feedback terminal P7 supplies the feedback voltage $V_{FB}$ to an inverting input terminal of the operational amplifier 50. The operational amplifier 50 amplifies a difference between the reference voltage $T_{REF}$ and the feedback voltage $V_{FB}$, and outputs an error signal ERR from an output terminal.

Based on the error signal ERR supplied from the operational amplifier 50, the PWM circuit 60 generates a reset signal RST that is used to apply pulse-width modulation to the voltage increasing clock signal BCK supplied from the oscillation circuit 40. For example, the PWM circuit 60 generates a triangle wave signal in synchronization with the rise of the voltage increasing clock signal BCK, and deactivates the reset signal RST to a low level in a period in which the triangle wave signal is lower in potential than the error signal ERR. On the other hand, the PWM circuit 60 activates the reset signal RST to a high level when the triangle wave signal is higher in potential than the error signal ERR.

For example, the control circuit 70 includes a logic circuit 71, an RS flip-flop 72, AND circuits 73 and 74, and an OR circuit 75. The control circuit 70 generates a charge signal CHG, an inductor connection signal IND, and a soft-start stop signal STP to control the soft-start operation and a normal voltage increasing operation of the switching regulator. The control circuit 70 also generates a driving signal DRV and supplies the driving signal DRV to the transistor QN1.

The transistor QN1 is a switching element in the switching regulator, and connected between the output terminal P6 and the second power supply terminal P2. The transistor QN1 includes a drain connected to the output terminal P6, a source connected to the second power supply terminal P2, and a gate to which the driving signal DRV is applied.

The transistor QN1 is placed in an ON state in a period in which the driving signal DRV is activated to a high level, and is placed in an OFF state and performs a switching operation in accordance with the driving signal DRV in a period in which the driving signal DRV is deactivated to a low level. Note that besides the N-channel MOS transistor, for example, a P-channel MOS transistor, a bipolar transistor, an IGBT (insulated-gate bipolar transistor), or a thyristor can be used as the switching element.

The switch circuit 80 is a first switch circuit in the switching regulator, and connected between the first power supply terminal P1 and the output terminal P6. For example, the switch circuit 80 may include a plurality of transistors that are connected in series to one another between the first power supply terminal P1 and the output terminal P6.

In the example shown in FIG. 1, the switch circuit 80 includes P-channel MOS transistors QP1 and QP2 that are connected in series to each other between the first power supply terminal P1 and the output terminal P6, an inverter 81 for controlling the transistors QP1 and QP2, an N-channel MOS transistor QN2, and a resistor R4.

The transistor QP1 includes a source connected to the first power supply terminal P1. The transistor QP2 includes a drain connected to a drain of the transistor QP1, and a source connected to the output terminal P6. In the semiconductor apparatus 100, a source and a drain of each P-channel MOS transistor are composed of, for example, two P-type impurity regions disposed inside an N-well of a P-type semiconductor substrate. In the foregoing description, among the two P-type impurity regions included in each of the transistors QP1 and QP2, the P-type impurity region that is electrically connected to an N-well is described as the source. However, the drain and the source of the transistor QP2 are reversed when described in harmony with the direction of current.

These P-type impurity regions and N-well form a parasitic PNP bipolar transistor. Furthermore, the first power supply terminal P1 supplies the power supply potential VDD to the N-well. Therefore, in a case where one P-channel MOS transistor is connected between the first power supply terminal P1 and the output terminal P6, a parasitic PNP bipolar transistor is placed in an ON state and current flows from the output terminal P6 to the first power supply terminal P1 when the potential of the output terminal P6 exceeds the potential of the first power supply terminal P1 by a threshold voltage or higher.

On the other hand, in a case where a plurality of P-channel MOS transistors are connected in series to one another between the first power supply terminal P1 and the output terminal P6, P-N junctions that are reversed with respect to a current path are inserted by disposing these transistors in different N-wells. In this way, even if the potential of the output terminal P6 exceeds the potential of the first power supply terminal P1, parasitic PNP bipolar transistors can prevent the flow of current from the output terminal P6 to the first power supply terminal P1.

The inverter 81 inverts the charge signal CHG supplied from the control circuit 70, and applies the inverted charge signal CHG to a gate of the transistor QP1. Therefore, the transistor QP1 is placed in an ON state when the charge signal CHG is activated to a high level, and the transistor QP1 is placed in an OFF state when the charge signal CHG is deactivated to a low level.

The transistor QN2 includes a drain connected to a gate of the transistor QP2, a source connected to a wire of the power supply potential VSS, and a gate to which the charge signal CHG is applied. The resistor R4 is connected between the drain and the gate of the transistor QP2.

Therefore, when the charge signal CHG is activated to a high level, the transistor QN2 is placed on an ON state and the gate of the transistor QP2 is placed in a low level, thereby placing the transistor QP2 in an ON state. Furthermore, when the charge signal CHG is deactivated to a low level, the transistor QN2 is placed in an OFF state and the gate of the transistor QP2 is pulled up by the resistor R4, thereby placing the transistor QP2 in an OFF state.

One end of the inductor L1 is connected to the output terminal P6 of the semiconductor apparatus 100. The transistor QB1 and the resistor R3 compose a second switch circuit connected between the first power supply terminal P1 of the semiconductor apparatus 100 and the other end of the inductor L1. With the configuration shown in FIG. 1, the semiconductor apparatus 100 can be downsized by using the second switch circuit, which is large in size so as to reduce ON resistance, as an external component of the semiconductor apparatus 100.

The transistor QB1 includes an emitter connected to the first power supply terminal P1, a collector connected to the other end of the inductor L1, and a base connected to the control terminal P5 via the resistor R3. The control circuit 70 applies the inductor connection signal IND to the base of the transistor QB1 via the resistor R3. When the inductor connection signal IND is activated to a low level, the transistor QB1 is placed in an ON state. When the inductor connection signal IND is deactivated to a high level, the transistor QB1 is placed in an OFF state.

The diode D1 is connected between the output terminal P6 of the semiconductor apparatus 100 and the voltage increasing node N1, and includes an anode and a cathode that are respectively connected to the output terminal P6 and the voltage increasing node N1. For example, a Schottky-barrier diode that has a lower forward voltage and a higher switching speed than a P-N junction diode may be used as the diode D1.

The capacitor C1 is connected between the voltage increasing node N1 and the second power supply terminal P2 of the semiconductor apparatus 100, and smooths the voltage of the voltage increasing node N1 (the output voltage of the switching regulator) $V_{OUT}$. The resistors R1 and R2 are connected in series to each other between the voltage increasing node N1 and the second power supply terminal P2 of the semiconductor apparatus 100, and composes a voltage divider circuit that generates the feedback voltage $V_{FB}$ by dividing the voltage $V_{OUT}$ of the voltage increasing node N1.

When the transistor QB1 is in an ON state, current flows through the inductor L1 in a period in which the transistor QN1 is in an ON state. At this time, the diode D1 is in an OFF state. Due to the flow of current through the inductor L1, electrical energy is converted into magnetic energy and accumulated in the inductor L1.

On the other hand, in a period in which the transistor QN1 is in an OFF state, the magnetic energy accumulated in the inductor L1 is discharged as the electrical energy, and current flows from the inductor L1 through the voltage increasing node N1 via the diode D1. As a result, the voltage increasing node N1 increases the power supply voltage (VDD-VSS) and generates the output voltage $V_{OUT}$, thereby charging the capacitor C1.

The output voltage $V_{OUT}$ is determined by a duty cycle of the driving signal DRV. An ON duty cycle D, which represents the fraction of a period in which the transistor QN1 is in an ON state, is expressed by the following Expression 1 using a period τ in which the driving signal DRV is activated in one cycle T of the voltage increasing clock signal BCK generated by the oscillation circuit 40.

$$D=\tau/T, \text{ where } 0 \leq D \leq 1 \quad \text{Expression 1}$$

In the foregoing configuration, the transistor QB1 and the resistor R3 that compose the second switch circuit may be built in the semiconductor apparatus 100. In this case, an increase in the number of terminals is prevented by using the control terminal P5 to connect the collector of the transistor QB1 built in the semiconductor apparatus 100 to the external inductor L1. Furthermore, a P-channel MOS transistor may be used in place of the PNP bipolar transistor QB1.

Alternatively, the resistors R1 and the R2 may be built in the semiconductor apparatus 100, and the diode D1 may further be built in the semiconductor apparatus 100. Furthermore, in place of the diode D1, a transistor may be built in the semiconductor apparatus 100. In this case, the control circuit 70 may control this transistor used in place of the diode D1 so that this transistor and the transistor QN1 are placed in ON state and an OFF state in an alternating manner.

Control Circuit

The following describes the configuration and operations of the control circuit 70 shown in FIG. 1 in detail with reference to FIGS. 1 to 4. In the control circuit 70, the logic circuit 71 includes, for example, a counter and a programmable timer. The counter generates a frequency-divided clock signal by dividing the frequency of the system clock signal SCK supplied from the clock signal generation circuit 20.

The programmable timer determines the timings of various operations based on the frequency-divided clock signal, and generates the charge signal CHG, the inductor connection signal IND, a first driving signal DRV1, and the soft-start stop signal STP. A value that the programmable timer refers to at this time may be set in hardware during the manufacture of the semiconductor apparatus 100, or may be set in a register by the CPU and the like.

The AND circuit 73 has a non-inverting input terminal to which the first driving signal DRV1 is supplied, and an inverting input terminal to which the soft-start stop signal STP is supplied. When the soft-start stop signal STP is deactivated to a low level, the AND circuit 73 outputs the first driving signal DRV1 from an output terminal.

The AND circuit 74 has a first input terminal to which an output signal Q of the RS flip-flop 72 is supplied, and a second input terminal to which the soft-start stop signal STP is supplied. When the soft-start stop signal STP is activated to a high level, the AND circuit 74 outputs the output signal Q of the RS flip-flop 72 as a second driving signal DRV2 from an output terminal.

The OR circuit 75 has two input terminals that are respectively connected to the output terminals of the AND circuits 73 and 74, and outputs the first driving signal DRV1 or the second driving signal DRV2 as the driving signal DRV from an output terminal. As a result, the OR circuit 75 outputs the first driving signal DRV1 when the soft-start stop signal STP is deactivated to a low level, and outputs the second driving signal DRV2 when the soft-start stop signal STP is activated to a high level.

Figure 2:
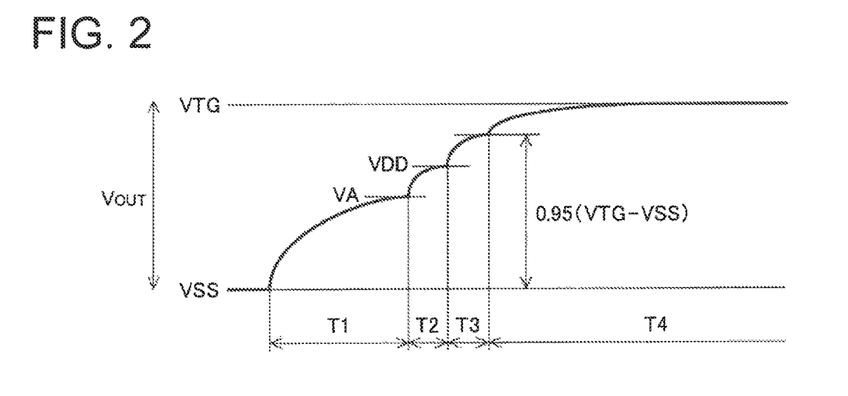
FIG. 2 is a waveform diagram showing a temporal change in an output voltage of a switching regulator.
Figure 3:
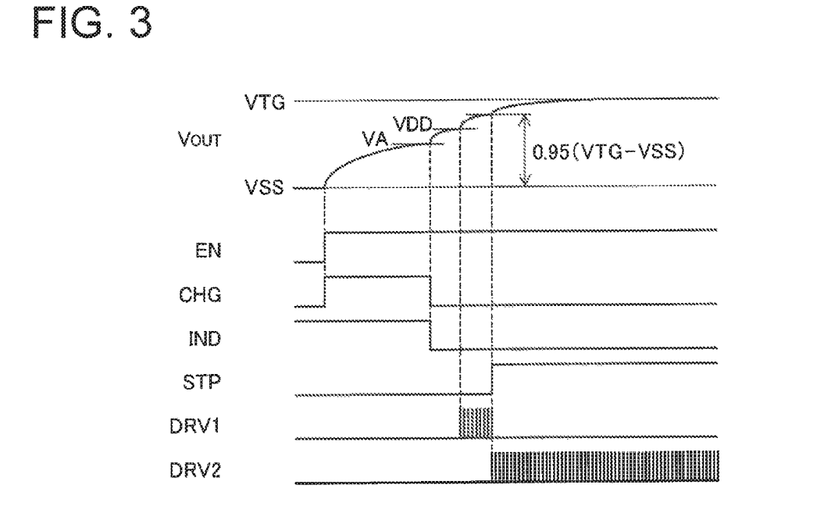
FIG. 3 is a waveform diagram showing various signals in correspondence with the output voltage of the switching regulator.

FIG. 2 is a waveform diagram showing a temporal change in the output voltage of the switching regulator. FIG. 3 is a waveform diagram showing temporal changes in various signals in correspondence with the output voltage of the switching regulator. As shown in FIG. 3, in an initial state, the charge signal CHG is deactivated to a low level, the inductor connection signal IND is deactivated to a high level, and the soft-start stop signal STP and the first driving signal DRV1 is deactivated to a low level.

For example, an external power supply switch or an operation unit supplies an enable signal EN, which is activated to a high level when the power is turned ON, to the control circuit 70. In response to the enable signal EN, the control circuit 70 activates the charge signal CHG to a high level, thereby placing the switch circuit 80 connected between the first power supply terminal P1 and the output terminal P6 in an ON state. As a result, the soft-start operation is started.

The control circuit 70 maintains the ON state of the switch circuit 80 for a first period T1 shown in FIG. 2. Each of the transistors QP1 and QP2 of the switch circuit 80 has, for example, an ON resistance of approximately 20Ω to 30Ω. The capacitor C1 is charged via the ON resistances of the transistors QP1 and QP2, and the diode D1.

In the first period T1, the potential of the voltage increasing node N1 increases from the power supply potential VSS to an intermediate potential VA. The intermediate potential VA is higher than the power supply potential VSS and lower than the power supply potential VDD, and is determined depending on the ON resistances of the transistors QP1 and QP2. The output voltage $V_{OUT}$ of the switching regulator is expressed as (VA-VSS).

When the first period T1 has elapsed since the switch circuit 80 was placed in the ON state, the control circuit 70 deactivates the charge signal CHG to a low level, thereby placing the switch circuit 80 in an OFF state. The control circuit 70 also activates the inductor connection signal IND to a low level, thereby placing the transistor QB1, which is connected between the first power supply terminal P1 and the other end of the inductor L1 whose one end is connected to the output terminal P6, in an ON state.

By thus applying voltage between the both ends of the inductor L1 after the potential of the output terminal P6 has increased, drastic fluctuations in a potential difference between the both ends of the inductor L1 can be suppressed. The transistor QB1 has, for example, an ON resistance of 1Ω or lower. The capacitor C1 is charged via the ON resistance of the transistor QB1, the inductor L1, and the diode D1. In a second period T2 shown in FIG. 2, the potential of the voltage increasing node N1 increases from the intermediate potential VA to the vicinity of the power supply potential VDD.

When a predetermined period has elapsed since the switch circuit 80 was placed in the ON state in response to the enable signal EN, the control circuit 70 causes the transistor QN1 to start the switching operation so as to increase the power supply voltage (VDD-VSS) supplied between the first power supply terminal P1 and the second power supply terminal P2.

For example, when the second period T2 has elapsed since the transistor QB1 was placed in the ON state, the control circuit 70 causes the transistor QN1 to start the switching operation. In this way, the transistor QN1 can start the switching operation in response to a further increase in the potential of the output terminal P6. Thereafter, different types of control are performed in a third period T3 and a fourth period T4 shown in FIG. 2.

After the second period T2 has elapsed since the transistor QB1 was placed in the ON state, the control circuit 70 supplies the first driving signal DRV1, which has an ON duty cycle that monotonically increases with time, to the transistor QN1 in the third period T3. In the third period T3, as the soft-start stop signal STP is deactivated to a low level, the first driving signal DRV1 generated by the logic circuit 71 is applied to the gate of the transistor QN1. Consequently, the transistor QN1 performs the switching operation in accordance with the first driving signal DRV1, and the voltage $V_{OUT}$ of the voltage increasing node N1 can be gradually increased.

In this case, a time constant circuit including a large-capacity capacitor is normally used. In the present embodiment, the logic circuit 71 generates the first driving signal DRV1 based on the high-speed system clock signal SCK supplied from the clock signal generation circuit 20. Accordingly, ON and OFF periods of the transistor QN1 in the soft-start operation can be finely set without using a time constant circuit including a capacitor. Furthermore, as a part of a test for the soft-start operation can be performed digitally, a test for the semiconductor apparatus can be made efficient.

Figure 4:
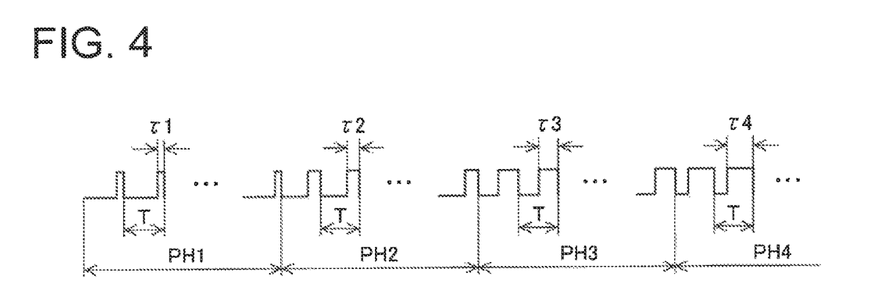
FIG. 4 is a waveform diagram showing a temporal change in a first driving signal in a third period shown in FIG. 2.

FIG. 4 is a waveform diagram showing a temporal change in the first driving signal in the third period shown in FIG. 2. In the example shown in FIG. 4, the third period T3 shown in FIG. 2 is divided into a plurality of phases PH1, PH2, PH3, PH4, . . . , and periods τ1, τ2, τ3, τ4, . . . in which the first driving signal DRV1 is activated gradually increase in these phases. Therefore, the ON duty cycle D expressed by Expression 1 gradually increases, and the voltage $V_{OUT}$ of the voltage increasing node N1 gently increases.

Referring back to FIGS. 2 and 3, after the voltage $V_{OUT}$ of the voltage increasing node N1 has exceeded a predetermined voltage, the control circuit 70 supplies the second driving signal DRV2, to which pulse-width modulation has been applied based on the voltage $V_{OUT}$ of the voltage increasing node N1, to the transistor QN1 in the fourth period T4. Here, it is preferable that the predetermined voltage is approximately 90% to 95% of a target voltage. In the example shown in FIG. 2, provided that the target voltage is (VTG-VSS), the voltage $V_{OUT}$ of the voltage increasing node N1 is compared with the predetermined voltage 0.95 (VTG-VSS).

To this end, the logic circuit 71 compares the value of the digital feedback signal DFB supplied from the ADC 30 with a preset threshold. For example, the threshold is set by multiplying the predetermined voltage by a voltage dividing rate of the voltage divider circuit (R2/(R1+R2)). When the value of the feedback signal DFB exceeds the threshold, the logic circuit 71 activates the soft-start stop signal STP to a high level. As a result, the soft-start operation is ended, and the normal voltage increasing operation is started.

In the fourth period T4, as the soft-start stop signal STP is activated to a high level, the second driving signal DRV2 output from the AND circuit 74 is applied to the gate of the transistor QN1. Consequently, the transistor QN1 performs the switching operation in accordance with the second driving signal DRV2, and the voltage $V_{OUT}$ of the voltage increasing node N1 can be converged on the target voltage (VTG-VSS).

The RS flip-flop 72 generates the output signal Q with a modulated pulse width based on the voltage increasing clock signal BCK supplied from the oscillation circuit 40 and the reset signal RST supplied from the PWM circuit 60. For example, when the reset signal RST is deactivated to a low level, the RS flip-flop 72 is set in synchronization with the rise of the voltage increasing clock signal BCK and activates the output signal Q to a high level.

Furthermore, when the voltage increasing clock signal BCK is deactivated to a low level, the RS flip-flop 72 is reset in synchronization with the rise of the reset signal RST and deactivates the output signal Q to a low level. The output signal Q is applied as the second driving signal DRV2 to the gate of the transistor QN1.

In the foregoing configuration, the control circuit 70 may set the first period T1 or the second period T2 based on the system clock signal SCK. In this way, the first period T1 or the second period T2 in the soft-start operation can be accurately set without using a time constant circuit including a capacitor.

Alternatively, the control circuit 70 may set the first period T1 or the second period T2 based on the voltage $V_{OUT}$ of the voltage increasing node N1. In this way, the first period T1 or the second period T2 in the soft-start operation can be adaptively set without using a time constant circuit including a capacitor. To this end, the logic circuit 71 compares the value of the digital feedback signal DFB supplied from the ADC 30 with a corresponding threshold for setting the first period T1 or the second period T2.

As described above, according to the present embodiment, the transistor QN1 starts the switching operation and increases the power supply voltage when the predetermined period has elapsed since the potential of the output terminal P6 started to increase upon the entry of the switch circuit 80 into the ON state. It is thus possible to realize a soft-start function of reducing inrush current by gradually raising the voltage of the voltage increasing node N1 after the power is turned ON.

Furthermore, as both of the switch circuit 80 and the transistor QN1 are connected to the output terminal P6, an increase in the number of terminals of the semiconductor apparatus 100 can be suppressed even if the switch circuit 80 and the transistor QN1 are built in the semiconductor apparatus 100. Moreover, it is possible to provide a power supply apparatus that realizes a soft-start function of reducing inrush current by gradually raising the output voltage $V_{OUT}$ after the power is turned ON with the use of the foregoing semiconductor apparatus 100.

Control Method for Power Supply Apparatus

Figure 5:
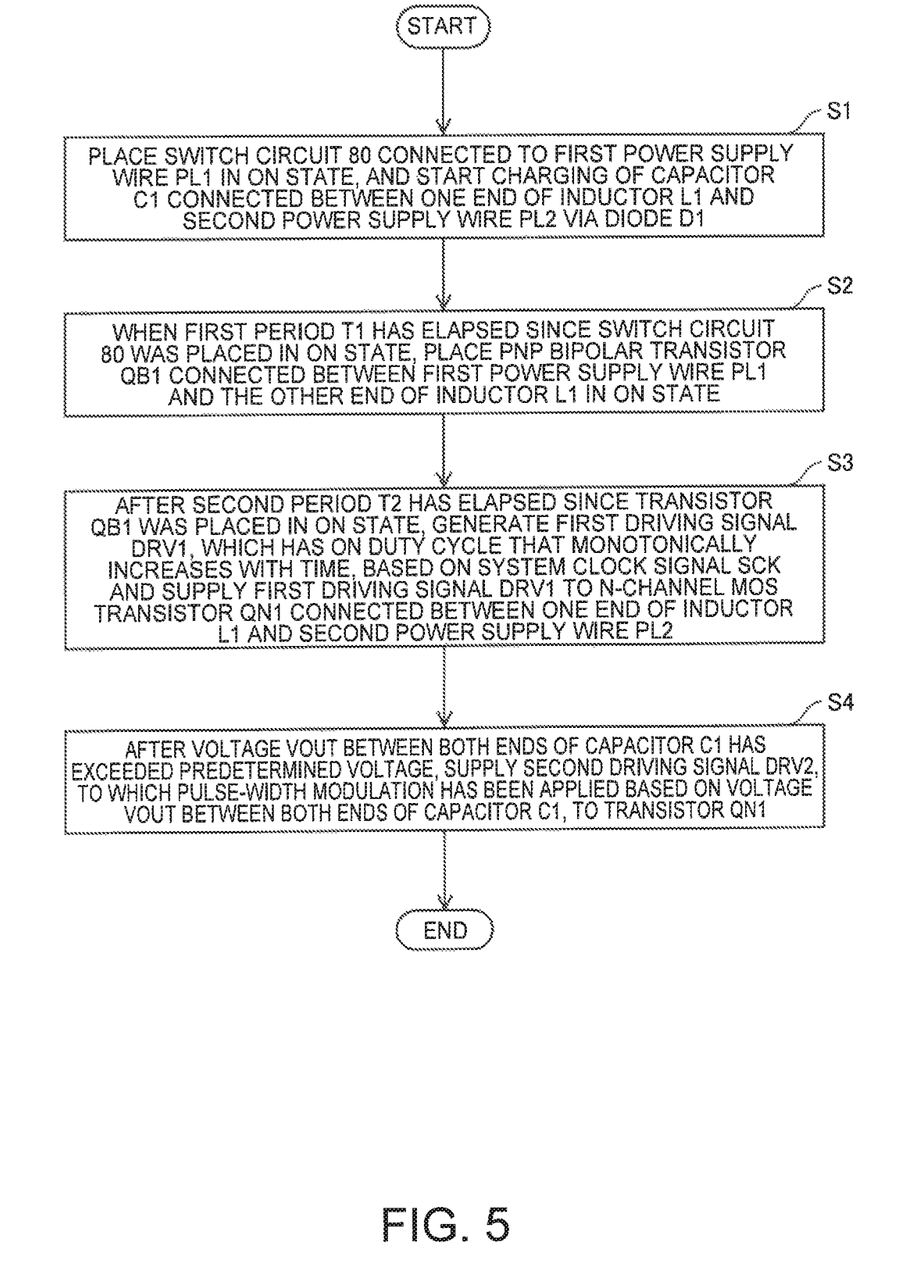
FIG. 5 is a flowchart showing a control method for the power supply apparatus according to an embodiment of the invention.

The following describes a control method for the power supply apparatus according to an embodiment of the invention with reference to FIGS. 1 to 5. FIG. 5 is a flowchart showing the control method for the power supply apparatus according to an embodiment of the invention.

This control method is a control method for the power supply apparatus (switching regulator) that increases the power supply voltage (VDD-VSS) supplied between the first power supply wire PL1 and the second power supply wire PL2 as shown in FIG. 1. Note that the switching regulator may be composed of a plurality of semiconductor apparatuses (ICs) or discrete components.

In step S1 shown in FIG. 5, the control circuit 70 places the switch circuit (first switch circuit) 80 connected to the first power supply wire PL1 in an ON state. Consequently, charging of the capacitor C1, which is connected between one end of the inductor L1 and the second power supply wire PL2 via the diode D1, is started, and the voltage (output voltage of the switching regulator) $V_{OUT}$ between the both ends of the capacitor C1 increases.

In step S2, when the first period T1 has elapsed since the switch circuit 80 was placed in the ON state, the control circuit 70 places the PNP bipolar transistor QB1, which is connected between the first power supply wire PL1 and the other end of the inductor L1 and composes the second switch circuit, in an ON state. Consequently, charging of the capacitor C1 is promoted, and the voltage $V_{OUT}$ between the both ends of the capacitor C1 further increases.

In step S3, after the second period T2 has elapsed since the transistor QB1 was placed in the ON state, the control circuit 70 generates the first driving signal DRV1, which has an ON duty cycle that monotonically increases with time, based on the system clock signal SCK and supplies the first driving signal DRV1 to the N-channel MOS transistor (switching element) QN1 connected between one end of the inductor L1 and the second power supply wire PL2. Consequently, the transistor QN1 performs the switching operation in accordance with the first driving signal DRV1, and the voltage $V_{OUT}$ of between the both ends of the capacitor C1 is gradually increased.

In step S4, after the voltage $V_{OUT}$ between the both ends of the capacitor C1 has exceeded the predetermined voltage, the control circuit 70 supplies the second driving signal DRV2, to which pulse-width modulation has been applied based on the voltage $V_{OUT}$ between the both ends of the capacitor C1, to the transistor QN1. Consequently, the transistor QN1 performs the switching operation in accordance with the second driving signal DRV2, and the voltage $V_{OUT}$ between the both ends of the capacitor C1 is converged on the target voltage.

With the control method for the power supply apparatus according to an embodiment of the invention, charging of the capacitor C1 is started with the switch circuit 80 placed in an ON state, and the voltage $V_{OUT}$ between the both ends of the capacitor C1 further increases with the transistor QB1 placed in an ON state. Thereafter, the first driving signal DRV1, which has an ON duty cycle that monotonically increases with time, is generated based on the system clock signal SCK and supplied to the transistor QN1. Therefore, ON and OFF periods of the transistor QN1 in the soft-start operation can be finely set without using a time constant circuit including a capacitor.

Electronic Device

A description is now given of an electronic device according to an embodiment of the invention.

Figure 6:
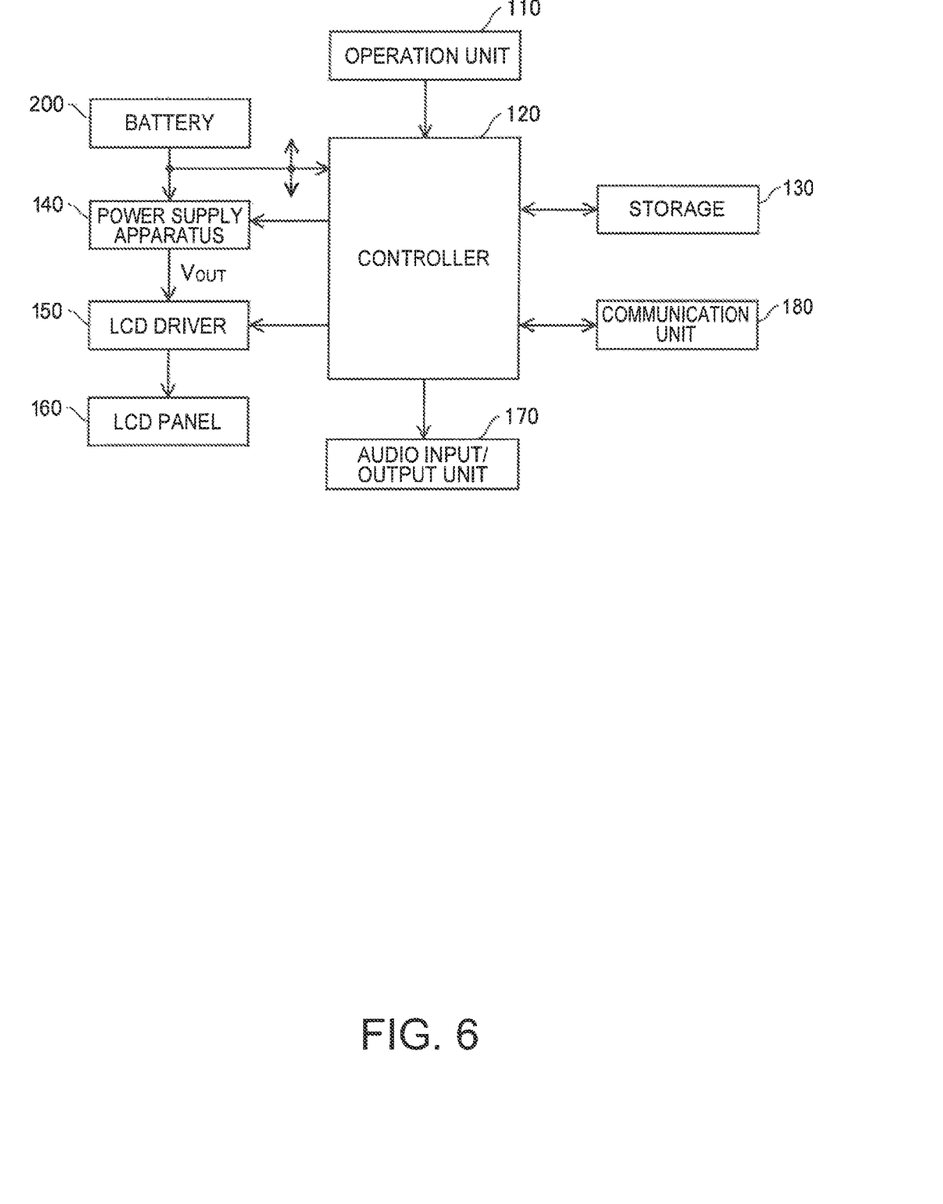
FIG. 6 is a block diagram showing an exemplary configuration of an electronic device according to an embodiment of the invention.

FIG. 6 is a block diagram showing an exemplary configuration of the electronic device according to an embodiment of the invention. In FIG. 6, a configuration of a mobile telephone is shown as an example of the electronic device. As shown in FIG. 6, the mobile telephone includes an operation unit 110, a controller 120, a storage 130, a power supply apparatus 140, an LCD driver 150, an LCD panel 160, an audio input/output unit 170, and a communication unit 180. The mobile telephone operates on a power supply voltage supplied from a battery 200.

Here, the controller 120, the storage 130, and a part of the power supply apparatus 140 may be built in the semiconductor apparatus 100 shown in FIG. 1 and compose a SoC. In this case, the LCD driver 150 is equivalent to the load Z shown in FIG. 1. Note that a part of the constituent elements shown in FIG. 6 may be omitted or changed. Alternatively, other constituent elements may be added to the constituent elements shown in FIG. 6.

The operation unit 110, for example, is an input apparatus including button switches or a touch sensor, and outputs an operation signal corresponding to a user operation to the controller 120. The controller 120, for example, includes a CPU and executes various types of signal processing and control processing in accordance with programs. For example, the controller 120 processes image signals and audio signals in accordance with an operation signal supplied from the operation unit 110, and also controls the communication unit 180 so as to communicate with the outside.

The storage 130, for example, includes a ROM (read-only memory) and a RAM (random-access memory). The ROM stores programs, data, and the like for the execution of various types of signal processing and control processing by the CPU. The RAM is used as a working area for the CPU, and temporarily stores, for example, programs and data that have been read out from the ROM, data that has been input using the operation unit 110, or the result of calculation that has been performed by the CPU in accordance with programs.

The power supply apparatus 140 generates the output voltage $V_{OUT}$ by increasing the power supply voltage supplied from the battery 200, and supplies the output voltage $V_{OUT}$ to the LCD driver 150. The power supply apparatus 140 may generate a plurality of output voltages with different voltage values and supply the plurality of output voltages to the LCD driver 150. Using the output voltage $V_{OUT}$ supplied from the power supply apparatus 140, the LCD driver 150 displays images on the LCD panel 160 based on image signals supplied from the controller 120.

The audio input/output unit 170, for example, includes a microphone and an ADC (analog-to-digital converter), as well as a DAC (digital-to-analog converter) and a speaker. The microphone outputs audio signals corresponding to applied acoustic waves. The ADC converts the analog audio signals supplied from the microphone into digital audio signals, and outputs the digital audio signals to the controller 120. The DAC converts digital audio signals supplied from the controller 120 into analog audio signals, and outputs the analog audio signals to the speaker. The speaker generates acoustic waves based on the audio signals supplied from the DAC.

The communication unit 180, for example, is composed of an analog circuit and a digital circuit. The communication unit 180 performs wireless communication with a cellular base station connected to a mobile telephone network, and accordingly transmits audio signals supplied from the controller 120 to the cellular base station, and outputs audio signals received from the cellular base station to the controller 120. At this time, the controller 120 processes signals supplied from the ADC of the audio input/output unit 170, and outputs the processed audio signals to the communication unit 180. The controller 120 also processes audio signals supplied from the communication unit 180, and outputs the processed audio signals to the DAC of the audio input/output unit 170.

In addition, the communication unit 180 performs wireless communication with a wireless access point connected to the Internet, and accordingly outputs image signals and audio signals received from the wireless access point to the controller 120. At this time, the controller 120 processes image signals supplied from the communication unit 180, and outputs the processed image signals to the LCD driver 150. The controller 120 also processes audio signals supplied from the communication unit 180, and outputs the processed audio signals to the DAC of the audio input/output unit 170.

Besides the mobile telephone, for example, the following can also be used as the electronic device: a mobile device such as a mobile information terminal, a timepiece such as a stand clock, a timer, an audio device, a digital still camera, a digital video camera, a head-mounted display, a personal computer, an onboard apparatus (e.g., a navigation apparatus), a calculator, an electronic dictionary, an electronic game device, a robot, a measurement device, a medical device (e.g., an electronic medical thermometer, a sphygmomanometer, a blood glucose meter, an electrocardiography measurement apparatus, an ultrasound diagnostic apparatus, and an electronic endoscope), etc.

The present embodiment can provide a highly reliable electronic device that reduces fluctuations in the power supply voltage when the power is turned ON with the use of a power supply apparatus that realizes a soft-start function of reducing inrush current by gradually raising the output voltage $V_{OUT}$ after the power is turned ON.

The invention is not limited to the foregoing embodiment, and can be modified in various ways by a person of ordinary skill in the art within the technical ideas of the invention.

What is claimed is:

1. A semiconductor apparatus, comprising:
   a switch circuit connected between a first power supply terminal and an output terminal;
   a switching element connected between the output terminal and a second power supply terminal; and
   a control circuit that, when a predetermined period has elapsed since entry of the switch circuit into an ON state in response to an enable signal, causes the switching element to start a switching operation to increase a power supply voltage supplied between the first power supply terminal and the second power supply terminal.

2. The semiconductor apparatus according to claim 1, wherein
   the control circuit places the switch circuit in an OFF state and places a second switch circuit in an ON state when a first period has elapsed since the entry of the switch circuit into the ON state, the second switch circuit being connected between the other end of an inductor having one end connected to the output terminal and the first power supply terminal.

3. The semiconductor apparatus according to claim 2, wherein
   the control circuit causes the switching element to start the switching operation when a second period has elapsed since entry of the second switch circuit into the ON state.

4. The semiconductor apparatus according to claim 3, wherein
   the control circuit supplies a first driving signal to the switching element after the second period has elapsed since the entry of the second switch circuit into the ON state, the first driving signal having an ON duty cycle that monotonically increases with time.

5. The semiconductor apparatus according to claim 4, wherein
   the control circuit supplies a second driving signal to the switching element after a voltage of a voltage increasing node has exceeded a predetermined voltage, the second driving signal having undergone pulse-width modulation based on the voltage of the voltage increasing node.

6. The semiconductor apparatus according to claim 1, wherein
   the switch circuit includes a plurality of transistors that are connected in series to one another between the first power supply terminal and the output terminal.

7. The semiconductor apparatus according to claim 4, further comprising
   a clock signal generation circuit that generates a system clock signal, wherein
   the control circuit generates the first driving signal based on the system clock signal.

8. The semiconductor apparatus according to claim 3, further comprising
   a clock signal generation circuit that generates a system clock signal, wherein
   the control circuit sets the first period or the second period based on the system clock signal.

9. The semiconductor apparatus according to claim 3, wherein
   the control circuit sets the first period or the second period based on a voltage of a voltage increasing node.

10. A power supply apparatus, comprising:
    the semiconductor apparatus according to claim 1;
    an inductor having one end connected to the output terminal;
    a diode connected between the output terminal and a voltage increasing node; and
    a capacitor connected between the voltage increasing node and the second power supply terminal.

11. The power supply apparatus according to claim 10, further comprising
    a second switch circuit connected between the first power supply terminal and the other end of the inductor.

12. An electronic device, comprising:
    the power supply apparatus according to claim 10; and
    a load to which an output voltage of the power supply apparatus is supplied.

13. A control method for a power supply apparatus that increases a power supply voltage supplied between a first power supply wire and a second power supply wire, the control method comprising:
    (a) placing a first switch circuit connected to the first power supply wire in an ON state, and starting charging of a capacitor connected between one end of an inductor and the second power supply wire via a diode;
    (b) placing a second switch circuit in an ON state when a first period has elapsed since entry of the first switch circuit into the ON state, the second switch circuit being connected between the first power supply wire and the other end of the inductor;
    (c) generating a first driving signal based on a system clock signal and supplying the first driving signal to a switching element connected between the one end of the inductor and the second power supply wire after a second period has elapsed since entry of the second switch circuit into the ON state, the first driving signal having an ON duty cycle that monotonically increases with time; and (d) supplying a second driving signal to the switching element after a voltage between both ends of the capacitor has exceeded a predetermined voltage, the second driving signal having undergone pulse-width modulation based on the voltage between the both ends of the capacitor.

* * * * *